United States Patent
Gunjal et al.

(10) Patent No.: US 12,034,874 B2
(45) Date of Patent: Jul. 9, 2024

(54) VALIDATING CERTIFICATES

(71) Applicant: INTERNATIONAL BUSINESS MACHINES CORPORATION, Armonk, NY (US)

(72) Inventors: Richard Daniel Gunjal, Bangalore (IN); Subhra Kanti Bhakta, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 250 days.

(21) Appl. No.: 17/497,950

(22) Filed: Oct. 10, 2021

(65) Prior Publication Data
US 2023/0112261 A1   Apr. 13, 2023

(51) Int. Cl.
*H04L 9/32* (2006.01)
*H04L 9/40* (2022.01)
*H04L 9/00* (2022.01)

(52) U.S. Cl.
CPC ........ *H04L 9/3268* (2013.01); *H04L 63/1433* (2013.01); *H04L 9/50* (2022.05)

(58) Field of Classification Search
CPC ...... H04L 9/3268; H04L 9/50; H04L 63/1433
See application file for complete search history.

(56) References Cited

U.S. PATENT DOCUMENTS

| | | | | |
|---|---|---|---|---|
| 7,290,133 B1* | 10/2007 | Montgomery | ........ | H04L 9/3263 713/175 |
| 8,683,052 B1* | 3/2014 | Brinskelle | ............... | H04L 63/04 709/228 |
| 11,783,342 B1* | 10/2023 | Griffin | ................... | G06Q 50/18 705/44 |
| 2005/0172335 A1* | 8/2005 | Aday | ................. | G06Q 20/4016 713/185 |
| 2009/0222925 A1* | 9/2009 | Hilaiel | .................... | G06F 21/53 726/25 |
| 2016/0373262 A1* | 12/2016 | Shearer | ................. | H04L 9/3263 |
| 2017/0330179 A1* | 11/2017 | Song | .................. | G06Q 20/3823 |
| 2019/0164015 A1* | 5/2019 | Jones, Jr. | ............... | G06N 5/022 |
| 2020/0052908 A1* | 2/2020 | Thitron | ................... | H04L 63/20 |
| 2020/0382326 A1 | 12/2020 | Guo | | |
| 2021/0083880 A1 | 3/2021 | Shearer | | |
| 2021/0110047 A1* | 4/2021 | Fang | ................. | H04L 63/1433 |
| 2022/0101326 A1* | 3/2022 | Kim | .................... | H04L 63/0464 |

FOREIGN PATENT DOCUMENTS

CN       109921910 A    6/2019
WO    2021078062 A1    4/2021

OTHER PUBLICATIONS

Mell, Peter et al.; "The NIST Definition of Cloud Computing;" National Institute of Standards and Technology; Special Publication 800-145; Sep. 2011; 7 pages.

* cited by examiner

*Primary Examiner* — Vance M Little
(74) *Attorney, Agent, or Firm* — Schmeiser, Olsen & Watts, LLP; Edward Wixted (57) ABSTRACT

An approach is provided for validating and managing certificates. A certificate is received. Information related to the certificate and additional information an additional data source are determined. A risk factor is rated based on the information related to the certificate and the additional information from the additional source. The certificate is validated based on the rating of the risk factor. A unique hashtag ID is generated for the validated certificate and recorded on a blockchain network.

15 Claims, 7 Drawing Sheets

VALIDATING CERTIFICATES

BACKGROUND

SSL (Secure Sockets Layer) protocol allows client/server applications to communicate across a network while preventing eavesdropping and tampering. SSL provides endpoint authentication and confidentiality and makes use of SSL certificates. Alternatively, Transport Layer Security (TLS) certificates or other standard certificates, such as those complying with the X.509 standard may be used. These may be referred to generally as certificates or a certificate.

SUMMARY

An embodiment of the present invention relates to a method, and associated computer system and computer program product. One or more processors of a computer system receive a certificate. The one or more processors of the computer system determine information related to the certificate and determine additional information from an additional data source. The one or more processors of the computer system rate a risk factor of the certificate based on the determined information and additional information and validate the certificate based on the rating of the risk factor. The one or more processors of the computer system generate a unique hashtag ID for the validated certificate and record the unique hashtag ID on a blockchain network.

DETAILED DESCRIPTION

Management of certificates may be complex, particularly for large enterprise organizations. For example, such large enterprise organizations may have dozens or hundreds of certificates to manage, with various customers, end-users, and third-party vendors relying on the validity of these certificates. Further, problems must be identified and addressed either by the knowledge/experience of the administrator or by scripts that lack any real intelligence. Often, certificate administration relies on alert conditions being sent to an operations team based on monitoring probes. Thus, the present art relies on an administrator or a script to identify any problems with certificates such as SSL certificates and often requires debugging, upgrading, and/or patching of certificates as well as time-consuming investigation of errors. Problem identification and resolution is therefore highly reactive, time consuming, and expensive. Further, it is difficult to ensure that the most trusted certificates are being purchased and used. Thus, new methods for validating and managing certificates would be well received in the art.

Embodiments of the present invention improve the management and validation of certificates, and thereby improve security and reliability. Further, embodiments of the present invention make use of a cognitive engine to process the verification, identity, and legitimacy of certificates in real time. As described in more detail below, the cognitive engine may make use of supervisory learning, non-supervisory learning, artificial intelligence, and the like. Further, embodiments of the present invention also make use of blockchain technology to record and track validated certificates. As described in more detail below, validated certificates may be recorded into a blockchain network, for example, by a unique hashtag ID generated for each validated certificate.

Figure 1:
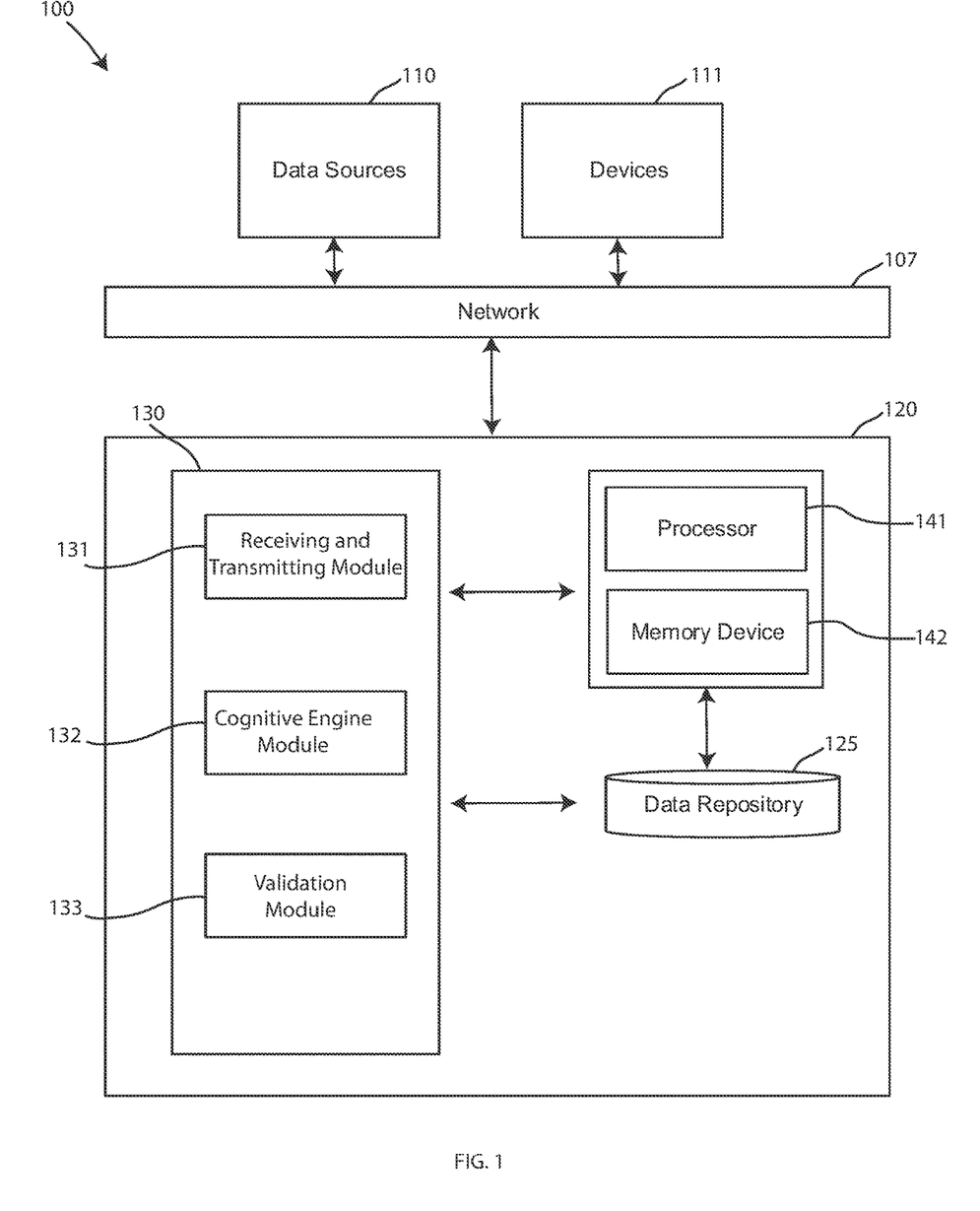
FIG. 1 depicts a block diagram of a system for validating certificates, in accordance with embodiments of the present invention.

FIG. 1 depicts a block diagram of a system for validating certificates 100, in accordance with embodiments of the present invention. Embodiments of the system for validating certificates 100 may be conducted by a computing system 120. Embodiments of the computing system 120 may be a computer system, a computer, a server, one or more servers, a cloud computing device, a hardware device, a remote server, and the like. Further, embodiments of the computing system 120 may be equipped with a memory device 142 which may store various data/information/code, and a processor 141 for implementing the tasks associated with the system for validating certificates 100. Still further, embodiments of the computing device 120 may include a data repository 125 which may store data, for example, certificates, information regarding certificates, end user or enterprise organization information, and the like. It will be understood that the computing system 120 may be, or may be associated with, any party involved in requesting, issuing, or using a certificate, such as an SSL certificate, and/or the computing system 120 may be, or may be associated with, a third party used for validating and managing certificates.

Furthermore, embodiments of the system for validating certificates 100 may include one or more data sources 110 and one or more devices 111 communicatively coupled to the computing system 120 of the system for validating certificates 100 over a network 107.

In an embodiment, the one or more data sources 110 may include a data source providing country information. For example, the one or more data sources 110 may include a data source having access to or otherwise including information regarding country designations. In an embodiment, the one or more data sources 110 may include a data source having access to or otherwise including information from the Office of Foreign Assets Control (OFAC) of the United States Department of the Treasury. The OFAC may designate certain countries as unauthorized, unsafe, unreliable, sanctioned, boycotted, etc. Further, the OFAC may maintain a list of countries, organizations, individuals, or other entities with which business, trade, export, import, or other actions are not permitted. In some embodiments, certificates originating in such countries may not, or should not, be permitted or used, and/or may be at a higher risk of being unsafe or invalid. For clarity, a respective designation of a respective country in an OFAC data source may be referred to generally as a status of the respective country.

In an embodiment, the devices 111 may be end users, third-parties, certificate authorities, and the like, or may be the enterprise organization itself. It will be understood that the one or more devices 111 may be any party involved in requesting, issuing, or using a certificate, such as an SSL certificate. Embodiments of the one or more devices 111 may be a device that is configured to interact with the computing system 120 and both provide information or inputs to the computer system 120 and receive outputs from the computing system 120. Further, embodiments of the one or more devices 111 may be a computer system, a computer, a server, one or more servers, a cloud computing device, a hardware device, a remote server, and the like. In an embodiment, a device 111 of the one or more devices 111 may comprise the computing system 120 or vice versa.

In embodiments, the one or more devices 111 may provide certificates to the computer system 120, for example, for validation or management. Alternatively, the computing system 120 may be configured to access the one or more devices 111 and certificates stored or used thereon, and provide validation or management services. It will be understood that information pertaining to certificates or to the one or more devices 111 may also be provided in addition to the certificates themselves. The certificate may comprise a certificate file. The certificate file may indicate whether the certificate is a valid certificate and an origination of the certificate, for example, a country of origin.

Still further, as discussed below, the certificate may be captured from applications or other components in a system, such as the computing system 120, and/or in a network, such as the network 107.

The network 107 may be a 4G, 5G and/or LTE based cellular data network or system. The network 107 may be a cloud network or system. Further embodiments of network 107 may refer to a group of two or more computer systems linked together. Network 107 may be any type of computer network known by individuals skilled in the art. Examples of computer networks 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA or a mobile communications data network. The architecture of the computer network 107 may be a peer-to-peer network in some embodiments, wherein in other embodiments, the network 107 may be organized as a client/server architecture.

Embodiments of the computing system 120 include a module structure 130 that includes a receiving and transmitting module 131, a cognitive engine module 132, and a validation module 133. A "module" herein refers to any hardware-based module, software-based module, or combination thereof. Embodiments of hardware-based modules may include self-contained components such as chipsets, specialized circuitry and one or more memory devices, while a software-based module may be part of a program code or linked to the program code containing specific programmed instructions, which may be loaded in the memory device of the computer system 120. A module (whether hardware, software, or a combination thereof) may be designed to implement or execute one or more particular functions or routines.

Embodiments of the receiving and transmitting module 131 may include one or more components of hardware and/or software program code for receiving and/or transmitting information and/or data from the one or more data sources 110 and the one or more devices 111. The receiving and transmitting module 131 is configured to provide an interface for the interactions between the computing system 120 and the one or more devices 111 and the one or more data sources 110. The receiving and transmitting module 131 may be configured to receive, access, or retrieve data or information from the one or more data sources 110, such as information from the OFAC discussed above. Likewise, the receiving and transmitting module 131 may further be configured to receive data or information from the one or more devices 111 such as certificates, information pertaining to certificates, or information pertaining to the one or more user devices as discussed above. Such data or information may be captured automatically. Still further, the receiving and transmitting module 131 may further be configured to capture certificates and/or information relating to certificates from applications or other activity on the computing system 120 and/or the network 107. For example, in some embodiments, the receiving and transmitting module may include micro automation codes that operate to automatically gather and check the certificate, information pertaining to the certificate, and/or additional information such as OFAC information. Thus, determining information relating to the certificate and additional information from additional data sources may be accomplished automatically within a system or within an enterprise organization. Still further, the micro automation codes may automatically collect updates to such information, for example, when a certificate is changed or updated. In some embodiments, log information for certificates implemented within a system or network may be automatically collected. Still further, in embodiments the captured data may be machine readable data. Further, in embodiments, data received, accessed, retrieved, or captured may be indexed to generate indexed information. Indexing may be performed when the data is received, accessed, retrieved, or captured. In some embodiments, indexing may be performed after evaluation or rating by the cognitive engine module 132 as will now be described in further detail according to embodiments.

Embodiments of the cognitive engine module 132 may include one or more components of hardware and/or software program code for performing cognitive engine rating of certificates, information pertaining to certificates, or information pertaining to the one or more user devices. In embodiments, the cognitive engine evaluation may employ both supervised learning and non-supervised learning. In further embodiments, the cognitive engine evaluation may employ artificial intelligence, other forms of machine learning, or combinations thereof.

In some embodiments, a first training or learning step may include training on unlabeled data, for example, unlabeled certificates. Different types and/or categories of certificates may be used, including without limitation, incorrect certificates, certificates that have bugs, certificates that are vulnerable to hacking or other issues, certificates originating from unauthorized countries, certificates with incorrect country names and/or country codes, and the like.

In embodiments the training or learning may then proceed with supervised learning, such as supervised training wherein labeled training data is provided. For example, annotated training data may be provided to the cognitive engine. The annotated training data may include certificates that are preprocessed and/or labelled. For example, the certificate may include a country name and/or a two letter country code. The annotated training data may indicate which country names and/or country codes can and/or cannot be validated (for example, based on information from the OFAC regarding the country's status or designation).

The training data may be pre-processed, tokenized, and converted into a specific format for the cognitive engine. In embodiments, the supervised training may be conducted offline and with human support, for example, oversight by a domain expert.

Following the supervised training or learning, non-supervised training or learning is employed. Data sets may be fed to the cognitive engine for evaluation. The cognitive engine will output predictions for samples in the data sets, for example, identifying certificates that the cognitive engine's prediction or probability that the certificate originates from a country that cannot be validated (for example, based on information form the OFAC regarding the country's status or designation). This non-supervised training or learning may be performed in real time and without human support or intervention.

The cognitive engine and/or the cognitive engine module 132, for example, a trained cognitive engine, will review newly issued certificates, unvalidated existing certificates, and/or changes in certificate information in real time and rate the certificates. Likewise, updated or changed OFAC information may be accessed and used in real time. Thus, the validation and rating process is dynamic and highly responsive to changing situations.

The cognitive engine's rating may include outputting a predicted score, weighting, or ranking. The predicted score, weighting, or ranking may indicate a likelihood that the certificate is valid or conversely is invalid. Thus, the certificate may be validated or cannot be validated. Further, a threshold may be used to determine whether a certificate should be indicated to be invalid or cannot be validated, whether an alert should be provided, or whether other action should be taken. In embodiments, different enterprise organizations may have different thresholds based on respective security requirements and other factors.

The cognitive engine is also not limited to analyzing the respective country code, although this analysis is often desirable. For example, the cognitive engine may also analyze a state or province name or other secondary geographical or locational information, an organization name, an organizational unit name, a common name, an email address, and the like. This information may be used as part of the cognitive engine's evaluation and rating of the certificate. For example, suspicious emails or organization names may be flagged or weighted in the rating.

Still further, it will be understood that the cognitive engine may use historical data as part of the rating. For example, in addition to using the training data and learned data, the cognitive engine may use historical data for an organization, for example, a certificate authority. The cognitive engine may weight historical information for the certificate authority, such as whether other certificates from the certificate authority have been identified as invalid or have resulted in issues or problems. Similar analyses may be performed with respect to other categories of information, such as geographical locations, names, email addresses, and the like.

In embodiments, the cognitive engine module 132 may include micro automation codes that operate to automatically gather and check the certificate, information pertaining to the certificate, and/or additional information such as OFAC information. The cognitive engine module's micro automation codes may be in addition to or an alternative to micro automation codes used in the receiving and transmitting module 131. Thus, determining information relating to the certificate and additional information from additional data sources may be accomplished automatically within a system or within an enterprise organization. For example, log information for certificates implemented within a system or network may be automatically collected. In embodiments, the information may be machine readable data. Still further, the micro automation codes may automatically collect updates to such information, for example, when a certificate is changed or updated. Further, in embodiments, data may be indexed for use in the cognitive engine module 132 and/or training thereof. Indexing may include indexing of the data and any accompanying rating for use in training and/or for weighting and rating other data.

Embodiments of the validation module 133 may include one or more components of hardware and/or software program code for validating certificates after evaluation/rating by the cognitive engine module 132. For example, when/if the cognitive engine module rates a certificate and predicts and/or determines that a certificate is valid or is likely valid, the rating may be provided to the validation module 133. In some embodiments, the certificate or information pertaining to the certificate may also be provided; in some embodiments, the validation module 133 may be configured to retrieve or access the certificate or information pertaining to the certificate from other components, for example, the data repository 125 or other components.

In embodiments, the validation module 133 may validate the certificate. Validation may include saving the validated certificate in a database, for example, the data repository 125 or other database.

Further, while not shown in the schematic view of FIG. 1, the validation module 133 (or other component/module of the computing system 120) may have access to a blockchain network. In some embodiments, the blockchain network may be a private blockchain network. In embodiments, validation of certificates by the validation module 133 may include adding a record of the validated certificate to the blockchain. For example, a unique hashtag ID may be created for the validated certificate. The unique hashtag ID may include information pertaining to the validated certificate, including but not limited to the information discussed above. For example, in embodiments, the unique hashtag ID may include the country name and/or country code, the state or province name or other secondary geographical or locational information, the organization name, the organizational unit name, the common name, the email address, and similar information. Further, a public key may be associated with the unique hashtag ID for each certificate.

While again not shown in the schematic view of FIG. 1, the one or more user devices, for example, the enterprise organization, certificate authority, end-user, third-party, and the like, may have public access to the blockchain, the blockchain network, and/or any blockchain database. In embodiments, this public access may be read-only.

In some embodiments a blockchain ledger may be used. The blockchain ledger may sit between respective devices in a system or network, for example between devices, such as the one or more devices 111, between devices such as the one or more devices 111 and additional data sources, such as the one or more data sources 110, and/or between devices, data sources, and an additional certificate authority. Further, the blockchain ledger may be configured to store data regarding validated certificates and check with data sources, such as the one or more data sources 110, for any updated information, such as changed OFAC information. In embodiments, the blockchain ledger may be provided by a third party or may be provided by or associated with the computing system 120 and/or the network 107. In embodiments, provision of the blockchain ledger by the computing system 120 and/or association of the blockchain ledger with the computing system 120 may enable the computing system 120, and/or the provider thereof, to provide a complete solution for validating and managing certificates and protecting validations using blockchain.

In embodiments, the one or more user devices, for example, the enterprise organization, certificate authority, end-user, third-party, and the like, may be provided with a private key. The private key is to be kept secure and may be used for validating certificate signing and decryption. Changes to validated and recorded certificates may only be permitted using respective private keys. Thus, changes to the country name, country code, and other information are only permitted by the current owner, i.e., the entity with the respective private key. As will be understood the blockchain, the blockchain network, and/or the blockchain database will include a blockchain ledger. The blockchain ledger thus stores a trusted record of validated certificates.

Referring again to the validation module 133, some certificates may be determined to be invalid and/or likely invalid. Such certificates may be referred to as certificates that cannot be validated. In embodiments, the validation module 133 may trigger an alert indicating that the certificate cannot be validated. The alert may be provided as desired in specific implementations of the embodiments, for example, to the one or more devices 111, to other parties over the network 107, or to other components of the computing device 120. Alternatively or additionally, other actions may be taken to address any security concerns.

Figure 2:
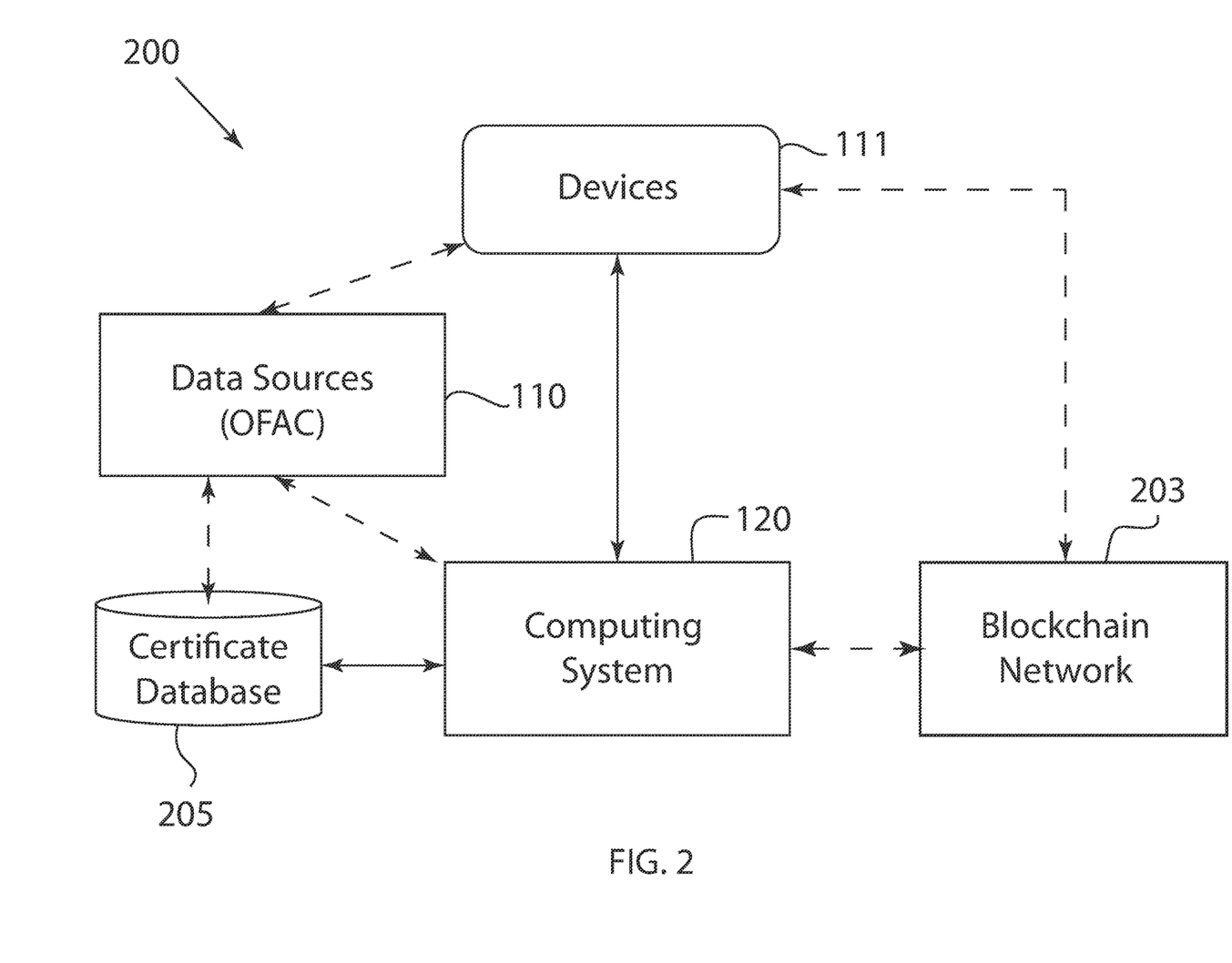
FIG. 2 depicts an embodiment of a system architecture for the system for validating certificates of FIG. 1, in accordance with embodiments of the present invention.

FIG. 2 depicts an embodiment of a system architecture 200 for the system for validating certificates 100 of FIG. 1, in accordance with embodiments of the present invention. The system architecture 200 includes the one or more data sources 110, the one or more devices 111, and the computing system 120.

In the depicted embodiment, the one or more data sources 110 is a data source having access to or otherwise including information from the Office of Foreign Assets Control (OFAC) of the United States Department of the Treasury. As discussed above, the OFAC may designate certain countries as unauthorized, unsafe, unreliable, sanctioned, boycotted, etc. Further, the OFAC may maintain a list of countries, organizations, individuals, or other entities with which business, trade, export, import, or other actions are not permitted. Thus, in the depicted embodiment, the one or more data sources 110 provide country information to the computing system and/or other components depicted in the system architecture 200.

Further, although not specifically depicted, the computing system 120 may include the components described above and shown in FIG. 1, including, for example, the receiving and transmitting module 131, the cognitive engine module 132, and/or the validation module 133.

In the depicted embodiment, a certificate database 205 is shown. The certificate database 205 may be a separate component or may be a component of the computing system 120. For example, in an embodiment, the certificate database 205 may comprise the data repository 125 and/or the data repository 125 may comprise the certificate database. Still further, in embodiments, the certificate database 205 may be a separate database in the computing system 120. As discussed above, validated certificates may be stored in the certificate database 205, along with information relating to the certificate.

Still further, the system architecture 200 may include one or more blockchain networks such as blockchain network 203. In some embodiments, the blockchain network 203 may be a private blockchain network. As discussed above, validated certificates may be recorded to the blockchain network 203. For example, a unique hashtag ID may be created for the validated certificate. The unique hashtag ID may include information pertaining to the validated certificate, including but not limited the country name and/or country code, the state or province name or other secondary geographical or locational information, the organization name, the organizational unit name, the common name, the email address, and similar information. This unique hashtag ID may be written to the blockchain network 203.

Referring still to FIG. 2, the one or more devices 111 may generate, receive, or otherwise provide a certificate. As discussed above, the one or more devices may be end users, third-parties, certificate authorities, and the like, or may be the enterprise organization itself. Again, it will be understood that the one or more devices 111 may be any party involved in requesting, issuing, or using a certificate, such as an SSL certificate. Further, it will be understood that the certificate may be a newly issued certificate or may be an existing certificate. For example, the system for validating certificates 100 may operate to validate certificates when the certificates are initially generated/created, may operate to validate existing certificates (for example, certificates that predate the implementation of the system for validating certificates 100 or were not validated for some other reason), and/or may operate to validate changes in certificates after issuance or after validation.

The certificate, along with information pertaining thereto, may be provided to the computing system 120. Providing the certificate may be performed passively or actively; for example, the one or more devices 111 may provide the certificate, the computing system 120 may request the certificate, the certificate may be captured automatically using micro automation codes as discussed above, and/or the certificate may be provided in some other manner. In embodiments, providing the certificate may be performed or facilitated by the receiving and transmitting module 131 or by other components.

In some embodiments, additional information may be provided to the computing system 120, for example, from the data sources 110. In some embodiments, providing additional information may include providing OFAC information, for example, providing information regarding which country names and/or country codes are unauthorized, unsafe, unreliable, sanctioned, boycotted, etc. Again, providing the additional information may be performed passively or actively; for example, the one or more data sources 110 may provide the additional information, the computing system 120 may request the additional information, the additional information may be captured automatically using micro automation codes as discussed above, and/or the additional information may be provided in some other manner. Providing the additional information may be performed or facilitated by the receiving and transmitting module 131 or by other components.

As discussed in additional detail in FIG. 1, the computing system 120, for example, the cognitive engine module 132 may analyze the certificate and/or the information related to the certificate and provide a rating. In some embodiments, the computing system 120 and/or the cognitive engine module employ micro automation codes to automatically check the certificate, the information relating to the certificate, and/or the information from the data sources 110, such as OFAC information as part of the rating.

The computing system 120, for example, the cognitive engine module 132 may rate a risk factor of the certificate based on the analysis of such information. Depending on the rating, the computing system 120, for example, the validation module 133 may either validate or not validate the certificate.

If the certificate is not or cannot be validated, the computing system 120 may take an action such as triggering an alarm or other output. For example, the alarm or other output may be sent to the one or more devices 111 or other components or parties. Still further, additional actions may be taken to mitigate any threat or weakness created by the certificate that cannot be validated.

If the certificate can be validated, the computing system 120, for example, the validation module 133, may generate a unique hashtag ID and record the unique hashtag ID on a blockchain network, such as blockchain network 203. Further, the validated certificate and/or the unique hashtag ID may be saved and/or stored, for example, in the certificate database 205, the data repository 125, and/or other locations.

Figure 3:
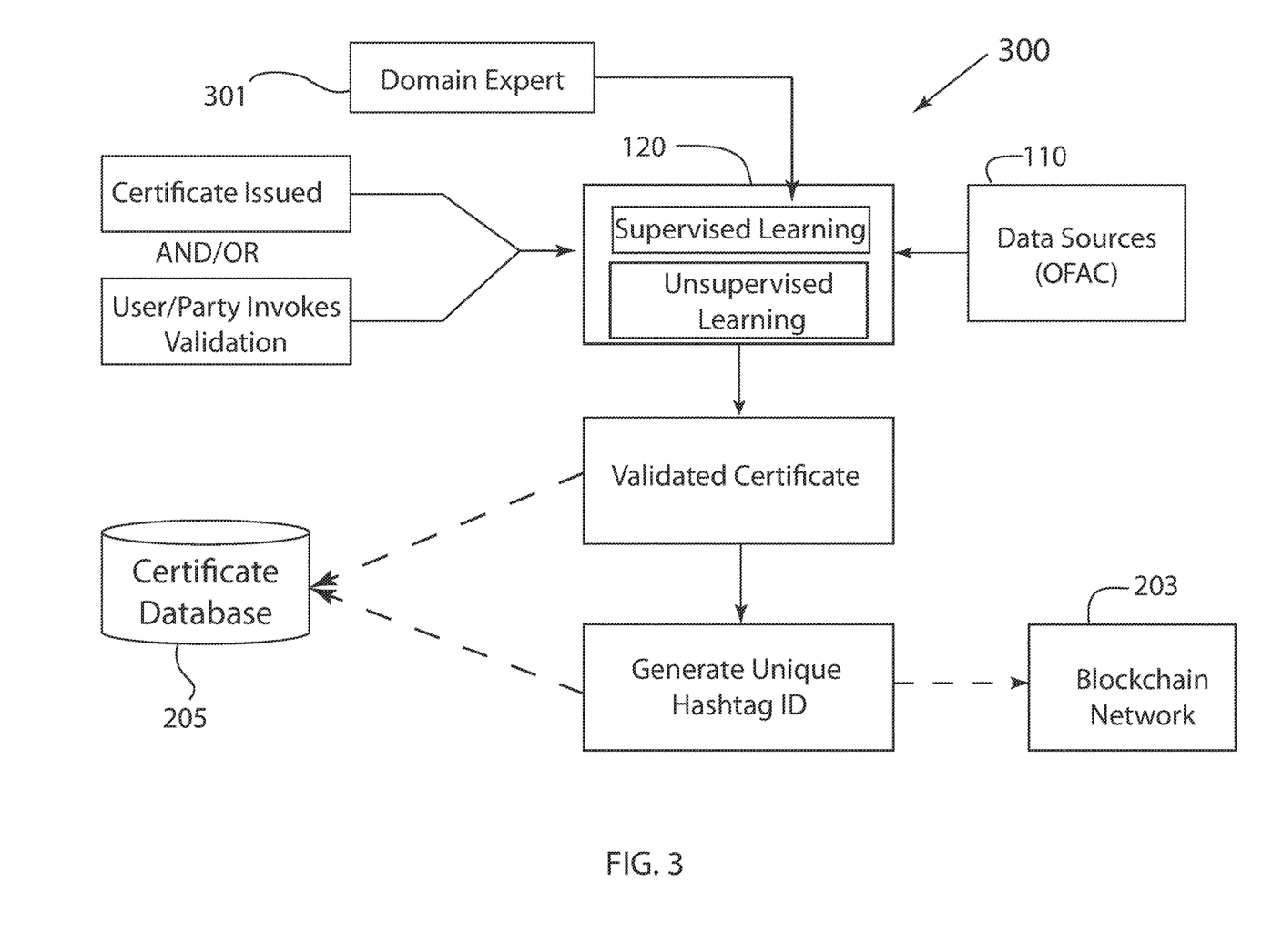
FIG. 3 depicts a flow chart of operation of the system/architecture for validating certificates 100 of FIGS. 1 and 2, in accordance with embodiments of the present invention.

FIG. 3 depicts a flow chart of operation of the system for validating certificates 100 of FIGS. 1 and 2, in accordance with embodiments of the present invention. As shown in the figure, validation may be initiated when a certificate is issued and/or when a user or party (such as the computing system 120 and/or one of the one or more devices 111) invokes validation or implements the systems and methods described herein. In still further embodiments, validation may be an ongoing continuous process and may be initiated when a change is made to a certificate and/or when other actions are taken or detected. The computing system 120 analyzes the certificate and related information, for example, using the cognitive engine module 133. As discussed above, the cognitive engine module 133 may use a cognitive engine that is trained using supervised learning and unsupervised learning. A domain expert 301 may be used to provide the supervised learning as shown in FIG. 3 and discussed above.

The computing system 120 analyzes the certificate based on the certificate and information related to the certificate, as well as additional information received from the data sources 110, for example, OFAC information regarding a country of origin of the certificate as shown and discussed in detail above.

FIG. 3 assumes that the certificate is successfully validated. In the case of validation, the validated certificate is stored, for example, in the certificate database 205 (and/or the data repository 125). Further, a unique hashtag ID is automatically generated for the validated certificate. As discussed above, the unique hashtag ID may include information pertaining to the validated certificate, including but not limited to the country name and/or country code, the state or province name or other secondary geographical or locational information, the organization name, the organizational unit name, the common name, the email address, and similar information. Further, a public key may be associated with the unique hashtag ID for each certificate. The unique hashtag ID may also be stored, for example, in the certificate database 205 (and/or the data repository 125). Still further, the unique hashtag ID is automatically recorded on the blockchain, for example, blockchain network 203. Thus, a record of the validated certificate is created.

As discussed above, the computing system 120 may be, or may be associated with, any party involved in requesting, issuing, or using a certificate or may be a third party. For example, the computing system 120 may be part of an enterprise organization that desires to manage and validate certificates used by the enterprise organization or entities interacting with the organization. Still further, the computing system 120 may be, or may be associated with, a third party, for example, a party contracted to manage and validate other party's certificates or certificates interacted with by the other party.

It will be understood that embodiments of the invention may act in real time or substantially close to real time. Thus, when certificates are issued and/or changed, the certificates may be analyzed/rated and/or validated in substantially real time. Further, the information used, both the information relating to the certificate and the additional information from the data sources such as the OFAC, may be substantially real time information. Thus, embodiments of the invention provide for a dynamic and up to date analysis of certificates based on changing world events.

It will be understood that embodiments of the invention may provide for an agentless approach which does not require additional servers and/or systems. Instead, the modules and/or micro automation codes discussed above may capture information related to the certificates and also the additional information from the data sources (such as OFAC information). Thus, the analysis and validation of the certificates may be performed automatically. As discussed above, if a certificate cannot be validated an alarm, alert, or other action may be triggered. Validated certificates may be automatically saved and/or automatically recorded on the blockchain without necessitating any user interaction or review.

Figure 4:
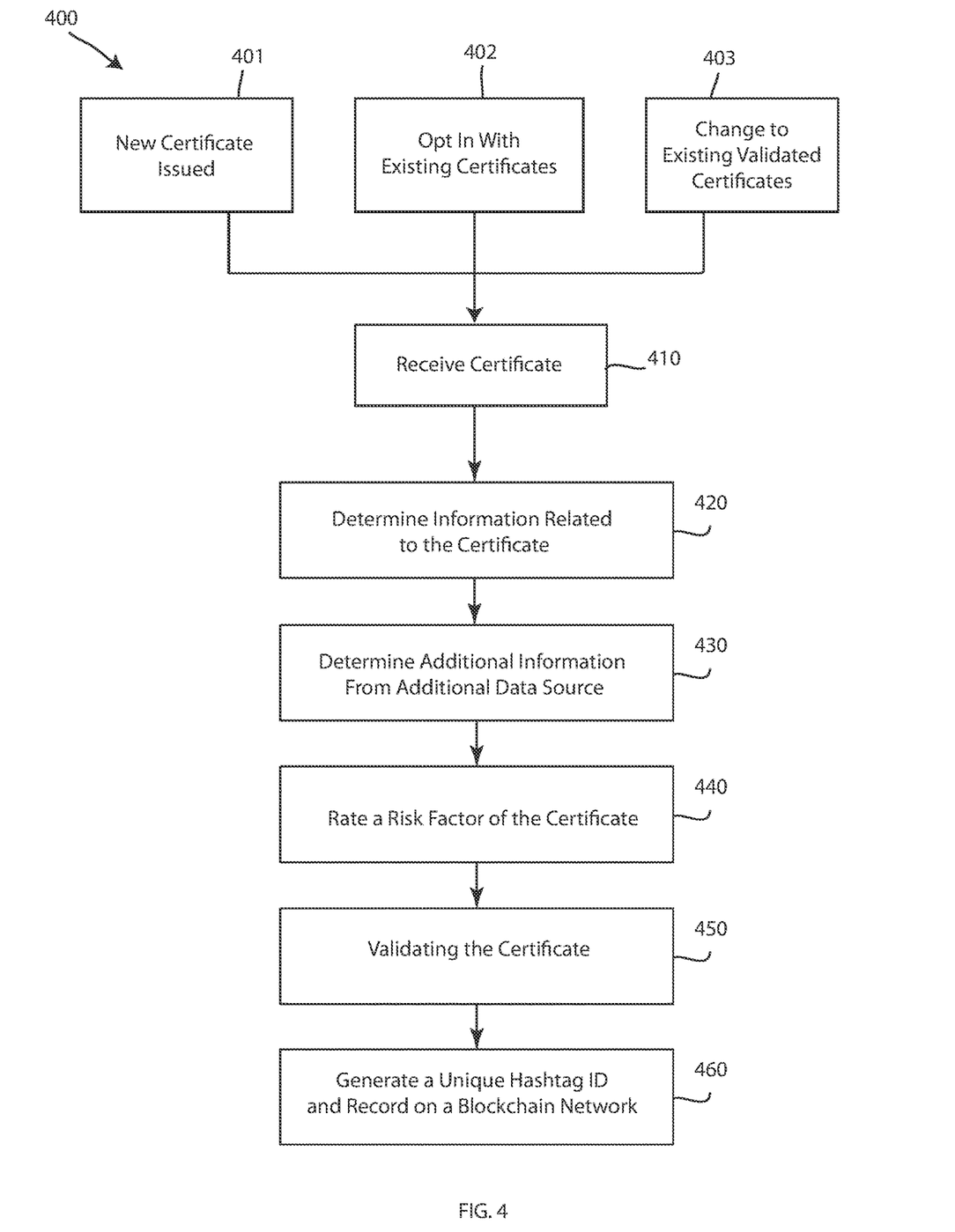
FIG. 4 depicts a method for validating a certificate performable by the system of FIG. 1, in accordance with embodiments of the present invention.

FIG. 4 depicts a method 400 for managing and validating certificates performable by the system of FIG. 1, in accordance with embodiments of the present invention. The method 400 may begin with one or more of steps 401, 402, and 403. In optional step 401 a new certificate is issued and the validation/management method is initiated. In optional step 402 an enterprise organization or other user or device may opt into a certificate management and/or validation service or may being implementing the systems and methods described herein. In this embodiment, there may be existing certificates to be validated/managed. In optional step 403, there may be a change to an existing certificate, for example, an existing validated certificate for which a unique hashtag ID exists in the blockchain. In some embodiments, the change to an existing certificate may be taken by an entity having the private key for the certificate. It will be understood that any one or more of these steps may initiate the method. Further, these steps are optional and other steps may be initiate the method or there may not be any initiating step required.

The method 400 includes a first step 401 of receiving a certificate by, for example, one or more processors of a computing system, such as the computing system 120. This certificate may be sent by one or more devices, such as the devices 111, or may be retrieved or accessed by the computing system. The step 410 may be, for example, performable by the receiving and transmitting module 131 of the module structure 130 of the computing system 120. In some embodiments, the certificate may be a certificate file.

The method 400 includes a step 420 of determining information related to the certificate. Determining may include receiving, retrieving, or accessing, for example, by the receiving and transmitting module 131 of the module structure 130 of the computing system 120, or may include or may include active performance such as an analysis of the certificate, for example, by the cognitive engine module 132 of the module structure 130 of the computing system 120 or some other component. In embodiments, one or more of the receiving and transmitting module 131 and the cognitive engine module 132 may include micro automation codes that operate to automatically determine and/or gather the information related to the certificate.

The method 400 may include a step 430 of determining additional information from an additional data source, such as the one or more data sources 110. Again, determining may include receiving, retrieving, or accessing, for example, by the receiving and transmitting module 131 of the module structure 130 of the computing system 120, or may include or may include active performance such as analysis of additional information, for example, by the cognitive engine module 132 of the module structure 130 of the computing system 120 or some other component. In embodiments, one or more of the receiving and transmitting module 131 and the cognitive engine module 132 may include micro automation codes that operate to automatically determine and/or gather the additional information from the additional data source.

The method 400 may include a step 440 of rating a risk factor of the certificate. Rating may be performed by the cognitive engine module 132 of the module structure 130 of the computing system 120. The rating may be performed in real time or substantially real time. The rating may be based on comparison of the determined information related to the certificate with the additional information. For example, as discussed above, comparison of a country name and/or country code with additional information from a data source including OFAC data may be used. In additional embodiments, the cognitive engine may also analyze a state or province name or other secondary geographical or locational information, an organization name, an organizational unit name, a common name, an email address, and the like, as well as historical data for any or all of these categories. For example, suspicious emails or organization names and/or emails or organization names that have historically provided suspicious certificates or certificates that cannot be validated may be flagged or weighted in the rating. The rating may include outputting a predicted score, weighting, or ranking. The predicted score, weighting, or ranking may indicate a likelihood that the certificate is valid or conversely is invalid.

The method 400 may include the step 450 of validating the certificate. Validating may be performable by the validation module 133 of the module structure 130 of the computing system 120. Validating may be performed following, and may be based on, the rating of the certificate by the cognitive engine module 132. As an example, when/if the cognitive engine module's rating predicts and/or determines that the certificate is valid or is likely valid, the rating and the certificate may be provided to the validation module 133. Validating may include saving the validated certificate in a database, for example, the data repository 125 or other database.

Conversely, some certificates may be determined to be invalid and/or likely invalid. Such certificates may be referred to as certificates that cannot be validated. In embodiments, the validation module 133 may trigger an alert or alarm indicating that the certificate cannot be validated. The alert or alarm may be provided as desired in specific implementations of the embodiments, for example, to the one or more devices 111, to other parties over the network 107, or to other components of the computing device 120. In further embodiments, other actions may be taken as appropriate to mitigate any security risks.

Further, the method 400 may include the step 460 of generating a unique hashtag ID for the certificate and recording the unique hashtag ID on a blockchain network such as the blockchain network 203. In some embodiments, the generating and recording may be part of the validating step. Further, in embodiments, the generating and recording step may be taken automatically upon validation of the certificate. In embodiments, the generating and recording may be performable by the validation module 133 of the module structure 130 of the computing system 120 or by other components. The unique hashtag ID may include information related to the validated certificate, including but not limited to the information discussed above. For example, in embodiments, the unique hashtag ID may include the country name and/or country code, the state or province name or other secondary geographical or locational information, the organization name, the organizational unit name, the common name, the email address, and similar information. In some embodiments, such as embodiments initiated by a change to an existing validated certificate, the generating and recording may include updating the unique hashtag ID for the existing certificate and/or generating a new unique hashtag ID for the existing certificate.

The method 400 may include additional steps such as training the cognitive engine of the cognitive engine module 132. For example, supervised and non-supervised training steps may be used. Still further, in some embodiments the step of outputting an alarm or alert or taking other action based on a certificate that cannot be validated may comprise a separate or additional step.

Embodiments of the invention may thus provide improved certificate management and validation. Further, embodiments may prevent proliferation of incorrect certificates, streamline troubleshooting for incorrect certificates, and improve debugging. Embodiments also provide additional information to the enterprise organization to facilitate informed decision making regarding origination of certificates.

Figure 5:
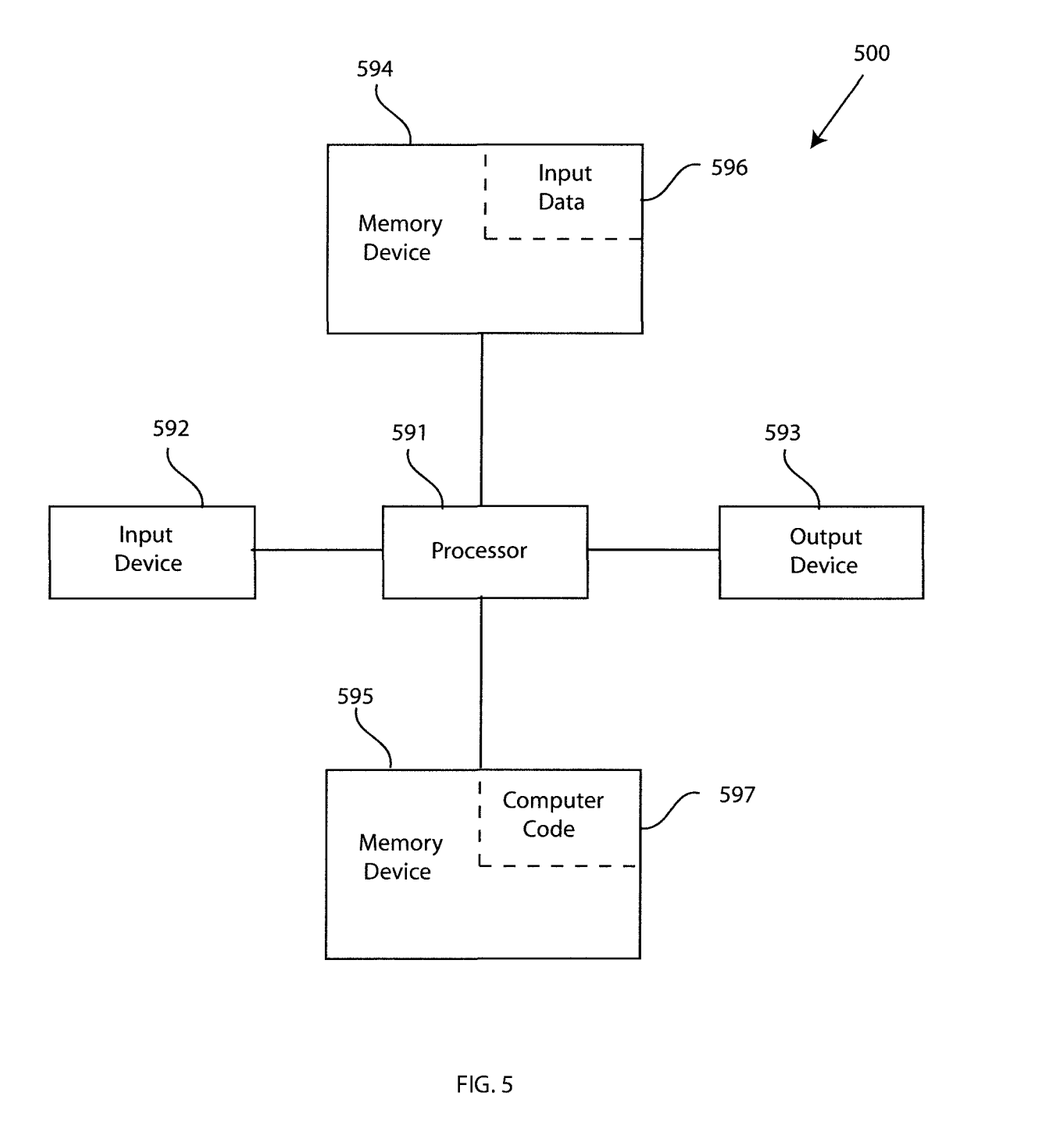
FIG. 5 depicts a block diagram of an exemplary computer system that may be included in the system for validating certificates of FIG. 1, capable of implementing process flows and methods for validating certificates of FIG. 4, in accordance with embodiments of the present invention.

FIG. 5 depicts a block diagram of an exemplary computer system that may be included in the system for validating certificates 100 of FIG. 1, capable of implementing methods and process flows for validating certificates of FIG. 4, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing method and processes for validating certificate in the manner prescribed by the embodiment of FIG. 4 using one, some or all of the components of the system for validating certificates 100 of FIG. 1, wherein the instructions of the computer code 597 may be executed by processor 591 via memory device 595. The computer code 597 may include software or program instructions that may implement one or more algorithms for implementing the methods and processes for validating certificates as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 4.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from one or more computer data storage units (not shown). The one or more computer data storage units include a known computer-readable storage medium, which is described below. In one embodiment, the one or more computer data storage units may be a non-volatile data storage device, such as a magnetic disk drive (i.e., hard disk drive) or an optical disc drive (e.g., a CD-ROM drive which receives a CD-ROM disk). In other embodiments, the one or more computer data storage unit may include a knowledge base or data repository 125, such as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to identification validation systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to perform the method for validating certificates. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for validating certificates. Thus, the present invention discloses a process for supporting, deploying and/or integrating computer infrastructure, integrating, hosting, maintaining, and deploying computer-readable code into the computer system 500, wherein the code in combination with the computer system 700 is capable of performing a method for validating certificates.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broadnetwork access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
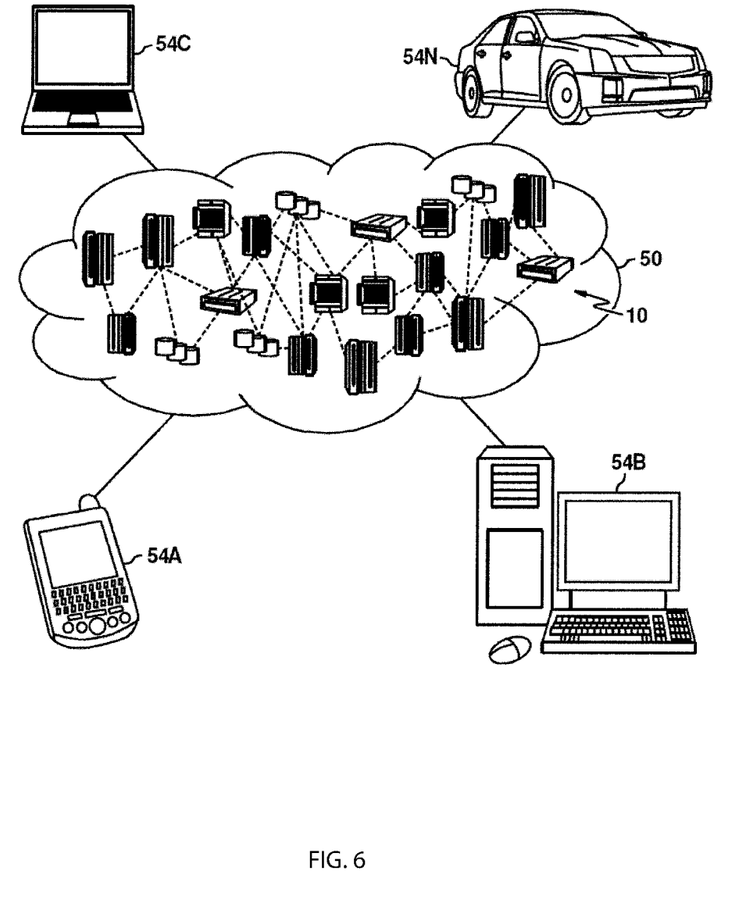
FIG. 6 depicts a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers or users, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Figure 7:
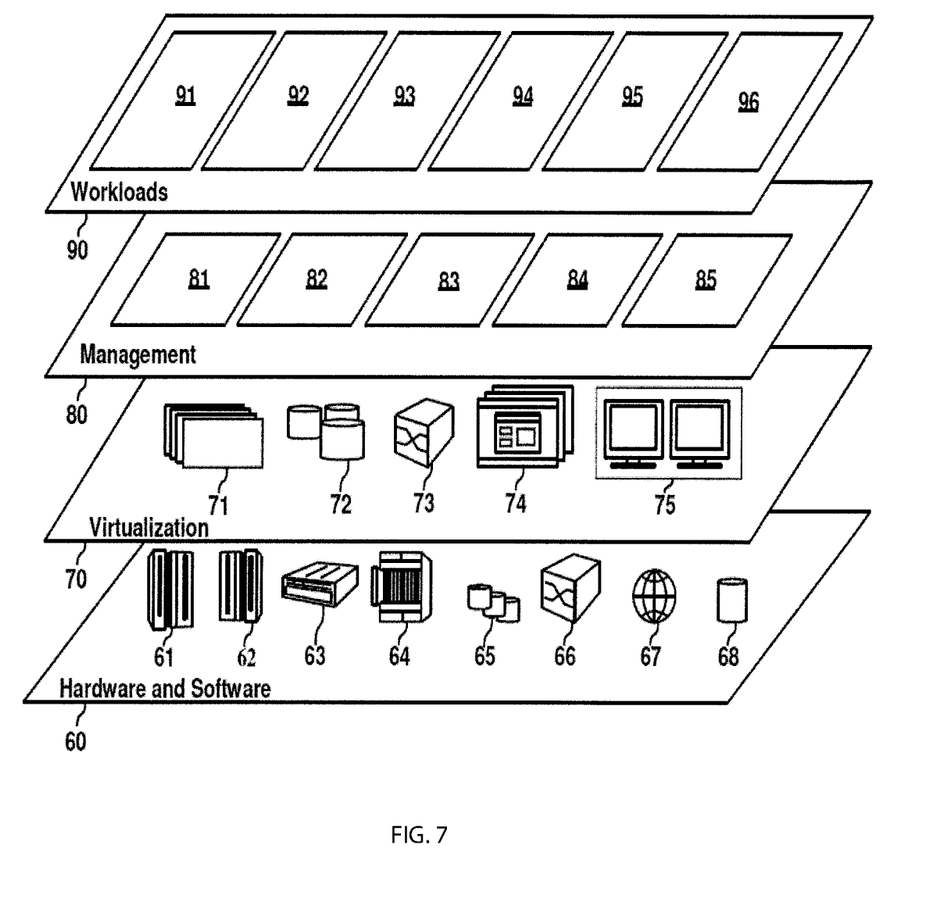
FIG. 7 depicts abstraction model layers, in accordance with embodiments of the present invention.

Referring now to FIG. 7, a set of functional abstraction layers provided by cloud computing environment 50 (see FIG. 6) are shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and validating certificates 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, the method comprising:
  receiving, by one or more processors of a computer system, a certificate;
  determining, by the one or more processors of the computer system, information related to the certificate, wherein determining information related to the certificate includes capturing information regarding a country name and/or country code of the certificate;
  determining, by the one or more processors of the computer system, additional information from an additional data source, wherein determining additional information from the additional data source includes a status of the country represented by the country name and/or country code;
  rating, by the one or more processors of the computer system, a risk factor of the certificate based on the information related to the certificate and the additional information from the additional data source, wherein rating the risk factor of the certificate is performed by a cognitive engine, wherein rating the risk factor of the certificate is based, at least in part, on the status of the country represented by the country code, wherein the cognitive engine is trained using supervised training and unsupervised training, and wherein supervised training is used to train the cognitive engine regarding respective country names and/or country codes that can or cannot be validated and unsupervised training is used to predict a probability of validation for sample certificates in a data set;
  validating, by the one or more processors of the computer system, the certificate based on the rating of the risk factor; and
  generating a unique hashtag ID for the validated certificate and recording the unique hashtag ID on a blockchain network.

2. The method of claim 1, wherein determining information related to the certificate includes automatic capturing by micro automation codes.

3. The method of claim 1, wherein the additional data source is a data source having access to or otherwise including information regarding the status of the country, wherein the status of the country includes a determination that the respective country is unauthorized, unsafe, unreliable, sanctioned, and/or boycotted.

4. The method of claim 1, wherein the certificate is a Secure Socket Layer (SSL) Certificate.

5. The method of claim 1, wherein the information related to the certificate includes an issuing certificate authority, and wherein rating the risk factor is based, at least in part, on historical data related to the issuing certificate authority.

6. A computer system, comprising:
  one or more processors;
  one or more memory devices coupled to the one or more processors; and
  one or more computer readable storage devices coupled to the one or more processors, wherein the one or more storage devices contain program code executable by the one or more processors via the one or more memory devices to implement a method, the method comprising:
    receiving, by one or more processors of a computer system, a certificate;
    determining, by the one or more processors of the computer system, information related to the certificate, wherein determining information related to the certificate includes capturing information regarding a country name and/or country code of the certificate;
    determining, by the one or more processors of the computer system, additional information from an additional data source, wherein determining additional information from the additional data source includes a status of the country represented by the country name and/or country code;
    rating, by the one or more processors of the computer system, a risk factor of the certificate based on the information related to the certificate and the additional information from the additional data source, wherein rating the risk factor of the certificate is performed by a cognitive engine, wherein rating the risk factor of the certificate is based, at least in part, on the status of the country represented by the country name and/or country code, wherein the cognitive engine is trained using supervised training and unsupervised training, and wherein supervised training is used to train the cognitive engine regarding respective country names and/or country codes that can or cannot be validated and unsupervised training is used to predict a probability of validation for sample certificates in a data set;
    validating, by the one or more processors of the computer system, the certificate based on the rating of the risk factor; and
    generating a unique hashtag ID for the validated certificate and recording the unique hashtag ID on a blockchain network.

7. The computer system of claim 6, wherein determining information related to the certificate includes automatic capturing by micro automation codes.

8. The computer system of claim 6, wherein the additional data source is a data source having access to or otherwise including information regarding the status of the country, wherein the status of the country includes a determination that the respective country is unauthorized, unsafe, unreliable, sanctioned, and/or boycotted.

9. The computer system of claim 6, wherein the certificate is a Secure Socket Layer (SSL) Certificate.

10. The computer system of claim 6, wherein the information related to the certificate includes an issuing certificate authority, and wherein rating the risk factor is based, at least in part, on historical data related to the issuing certificate authority.

11. A. computer program product, comprising one or more computer readable hardware storage devices storing a computer readable program code, the computer readable program code comprising an algorithm that when executed by one or more processors of a computing system implements a method, the method comprising:
  receiving, by one or more processors of a computer system, a certificate;
  determining, by the one or more processors of the computer system, information related to the certificate, wherein determining information related to the certificate includes capturing information regarding a country name and/or country code of the certificate;

determining, by the one or more processors of the computer system, additional information from an additional data source, wherein determining additional information from the additional data source includes a status of the country represented by the country name and/or country code;

rating, by the one or more processors of the computer system, a risk factor of the certificate based on the information related to the certificate and the additional information from the additional data source, wherein rating the risk factor of the certificate is performed by a cognitive engine, wherein rating the risk factor of the certificate is based, at least in part, on the status of the country represented by the country name and/or country code, wherein the cognitive engine is trained using supervised training and unsupervised training, and wherein supervised training is used to train the cognitive engine regarding respective country names and/or country codes that can or cannot be validated and unsupervised training is used to predict a probability of validation for sample certificates in a data set;

validating, by the one or more processors of the computer system, the certificate based on the rating of the risk factor; and generating a unique hashtag ID for the validated certificate and recording the unique hashtag ID on a blockchain network.

12. The computer program product of claim 11, wherein determining information related to the certificate includes automatic capturing by micro automation codes.

13. The computer program product of claim 11, wherein the additional data source is a data source having access to or otherwise including information regarding the status of the country, wherein the status of the country includes a determination that the respective country is unauthorized, unsafe, unreliable, sanctioned, and/or boycotted.

14. The computer program product of claim 11, wherein the certificate is a Secure Socket Layer (SSL) Certificate.

15. The computer program product of claim 11, wherein the information related to the certificate includes an issuing certificate authority, and wherein rating the risk factor is based, at least in part, on historical data related to the issuing certificate authority.

* * * * *